April 27, 1943.   J. HERTRICH   2,317,528
CLUTCH MECHANISM FOR CENTRIFUGAL MACHINES AND THE LIKE
Filed Sept. 6, 1939   2 Sheets-Sheet 1

INVENTOR
JOSEPH HERTRICH
BY
Hammond & Littell
ATTORNEYS

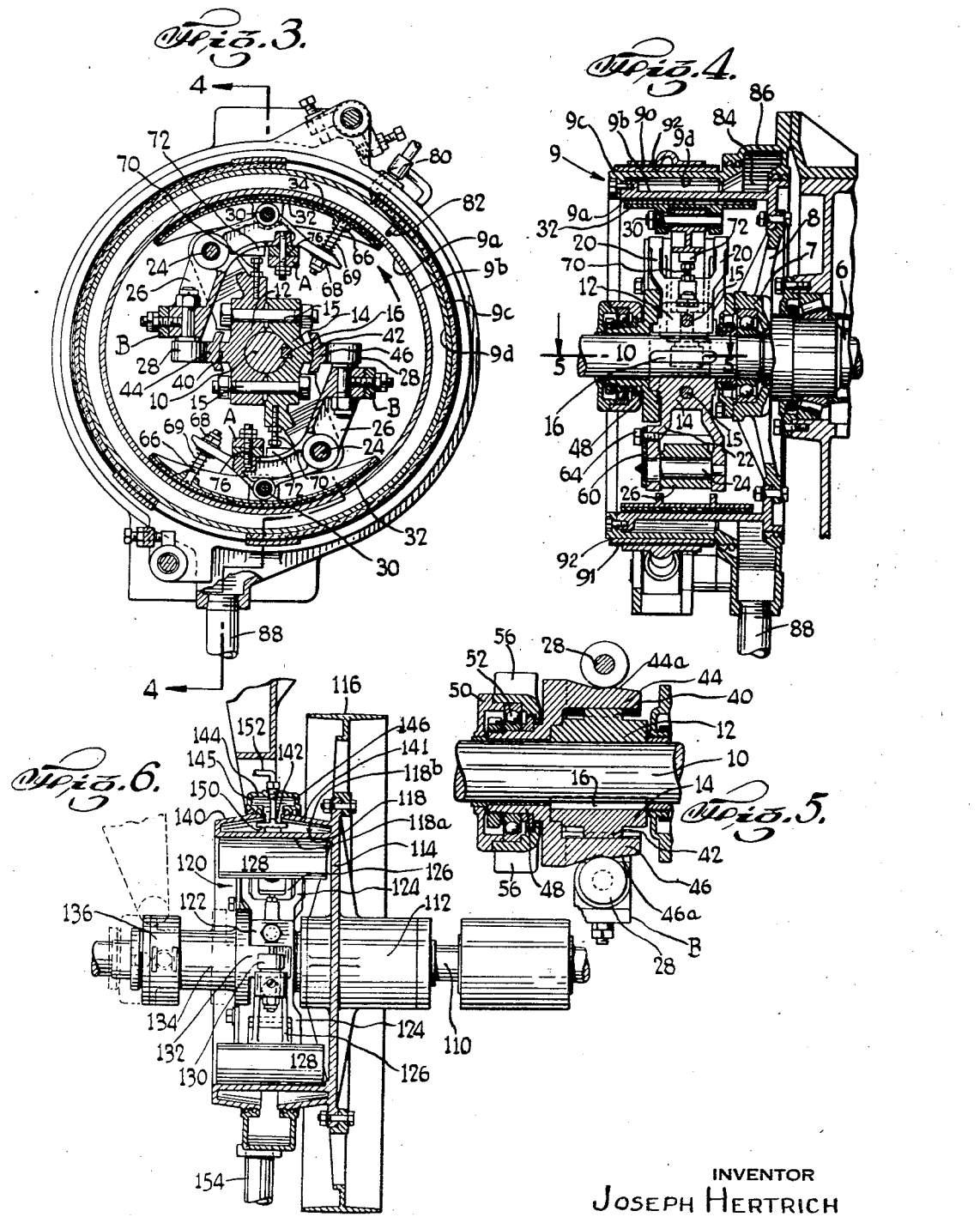

Patented Apr. 27, 1943

2,317,528

UNITED STATES PATENT OFFICE 2,317,528

CLUTCH MECHANISM FOR CENTRIFUGAL MACHINES AND THE LIKE

Joseph Hertrich, Hamilton, Ohio, assignor to The Western States Machine Company, Hamilton, Ohio, a corporation of Utah Application September 6, 1939, Serial No. 293,550 In Australia July 11, 1939

13 Claims. (Cl. 192—105)

This invention relates to heavy duty clutch mechanisms, and particularly to improvements in clutch mechanisms for centrifugal machines of the kind employed in the manufacture of sugar.

A purpose of the present invention is to provide a clutch mechanism which gives an exceedingly strong accelerating torque and permits a heavily-loaded centrifugal to be brought from zero speed, or from a low charging speed, to a high operating speed within a very short interval of time, and with a high operating efficiency. Further purposes of the invention are to provide such a clutch mechanism which runs smoothly and uniformly for indefinitely long periods of use; which may be adjusted entirely within itself, without dependence on extraneous control mechanisms for the uniformity or intensity of its action; which ensures uniform pressure on the clutch linings and uniform torque transmission in successive cycles of the machine; which permits accurate and uniform adjustments of the clutch shoes; and which permits the torque transmitted by the clutch to be varied readily, whereby to permit the establishment of selected rates of acceleration for the centrifugal, within a wide range of available acceleration rates.

Still further objects of the invention are to provide a clutch mechanism of the type indicated which occupies a minimum of space along the driving shaft, which allows the driving shaft to be rotated at a very high speed, and which minimizes the wearing of friction linings.

The clutch mechanism of the present invention performs the function of transmitting accelerating torque from a constantly revolving line shaft to a centrifugal or other heavy machine that operates on short cycles at a high speed. A friction rim connected indirectly with the spindle of the centrifugal, either through a driving belt or through a gear assembly, serves as the driven member of the clutch, and the new clutch mechanism which drives this friction rim is secured to the revolving line shaft to rotate therewith. The clutch mechanism includes a hub secured to the line shaft, a pair of radial arms extending from this hub, a clutch lever fulcrumed intermediate its ends to each arm by means of an axially-directed fulcrum pin, and a clutch shoe swivelled to each lever intermediate its fulcrum and its outer extremity. The clutch shoes are arcuate and are faced with friction linings. The other extremity of each clutch lever extends from the fulcrum point toward the axis of the mechanism and carries a cam roller at its end which is free to roll around an axis transverse to the line shaft. A ring carrying an axially-directed wedge arm inside of each cam roller is keyed to rotate with the line shaft and to be slid back and forth thereon, so that the rollers are forced outwardly by the wedges when the ring is in one position and are allowed to move inwardly when the ring and wedges are in another position.

The centrifugal force produced by the weight of the revolving clutch shoes and levers furnishes the pressure on the friction rim which causes the rim and the connected centrifugal machine to accelerate. At a given speed of the shaft, this pressure is constant as long as the weight of the clutch shoes and clutch levers is constant. Provision is made for varying the pressure, and for thereby varying the rate of acceleration, by adding or removing weights to the clutch levers on either side of their fulcrums. The addition of weight on the clutch shoe side of the fulcrum increases the friction and the accelerating torque of the clutch, whilst the addition of weight on the other side of the fulcrum decreases the accelerating torque of the clutch by counterbalancing to a certain extent the weight of the clutch shoes.

Another feature of the improved mechanism is that means are provided for accurately varying the setting of the clutch levers with respect to the axis of the mechanism, whereby to adjust the clearance between the friction rim and the friction linings of the clutch shoes. This means consists of an eccentric mounting for each clutch lever, which is provided by eccentric formation of the fulcrum pins which connect the levers with the fixed rotary arms of the mechanism. An adjusting member is joined to each eccentric pin so that the pin may be turned readily to effect an adjustment, after which it is held securely in its adjusted position. In conjunction with such adjusting means, an adjustable connection is provided between the heel of each clutch shoe and the outer extremity of each clutch lever, whereby to control accurately the clearance between the heel end of the friction lining and the friction rim.

Further features and advantages of the present invention will be apparent from the following detailed description, when considered in connection with the accompanying drawings. In the drawings:

Figure 3 is a vertical transverse section through the clutch mechanism;

Figure 4 is a vertical longitudinal section, along line 4—4 of Figure 3.

Figure 5 is an enlarged horizontal section, along line 5—5 of Figure 4, showing details of construction; and Figure 6 is a vertical longitudinal section through a combined belt pulley and clutch, showing an application of the invention to the clutch of a belt-driven centrifugal machine.

Figures 1, 2:
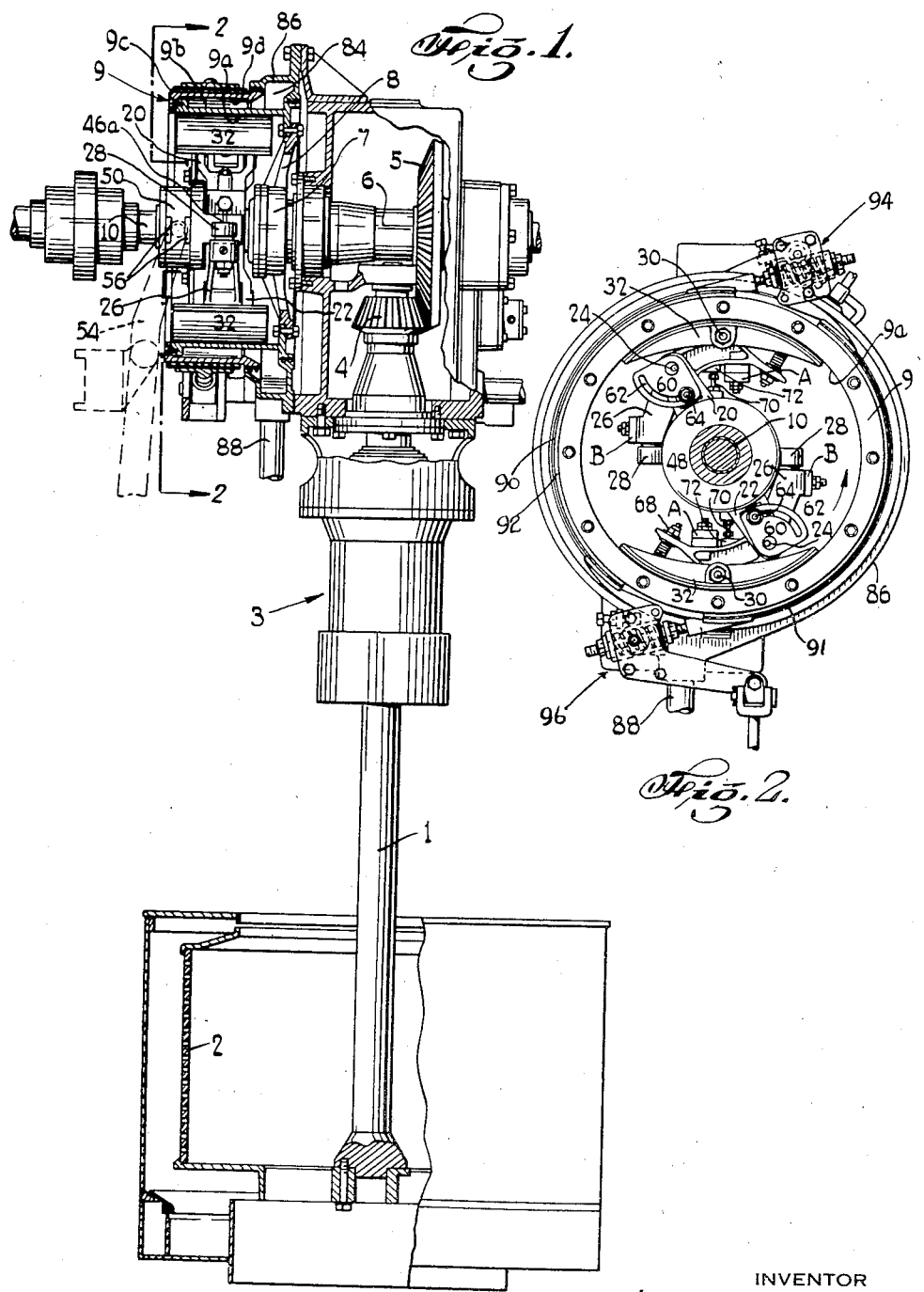
Figure 1 is a front elevation, partly in section, showing a gear driven centrifugal machine equipped with the improved clutch mechanism.
Figure 2 is a side elevation of the clutch mechanism, viewed along line 2—2 of Figure 1.

Referring first to Figures 1 to 5, a centrifugal machine is shown in these figures which includes a perforate basket 2 suspended from a gyratory head 3 by a spindle 1. A short transmission shaft connects the head with a bevel gear pinion 4 which meshes with a bevel gear 5 secured to a horizontal rotatable driving member in the form of a quill 6. The quill 6 is secured at its other end to hub 7 of a drum having a radial spider 8 and an annular friction rim 9. A line shaft 10, which is adapted to be revolved constantly, is arranged coaxially with respect to the friction rim 9, and the line shaft carries the improved clutching mechanism. The clutch mechanism is arranged inside of the friction rim and cooperates with an inner friction surface 9a on the rim. The shaft 10 carries a split hub including parts 12 and 14 which are joined together by bolts 15 and are keyed to shaft 10 by a key 16 so that the hub revolves with the shaft.

Integral fork arms 20 and 22 extend radially from the hub parts 12 and 14, and a fulcral pin 24 bridges each fork. A J-shaped lever 26 is fulcrumed intermediate its ends on each pin 24. Lever 26 carries a cam roller 28 at its inner end. A swivel pin 30 is mounted on lever 26 intermediate its fulcral point 24 and its outer extremity. An arcuate clutch shoe 32, faced with a friction lining 34, is swivelled onto the lever 26 by means of the pin 30, the swivel pin being centrally located with respect to the clutch shoe and extending parallel to the axis of rotation of shaft 10. Each of the clutch shoes 32 is thus arranged to be revolved with the shaft 10 and to move into frictional engagement with the clutching surface 9a of the rim 9 when free to move under the influence of centrifugal force. The centrally-located swivel mounting of each shoe on lever 26, through pin 30, permits the shoe to equalize its pressure against the rim. The amount of pressure exerted—consequently, the accelerating torque of the mechanism and the accelerating time of the machine, are dependent upon the effective weight of levers 26 and shoes 32 and upon their speed of rotation. When the machine is to be stopped, it is of course necessary to disengage the clutch shoes 32 from the friction rim, as the line shaft 10 and the clutch shoes are constantly revolving. This disengagement of the clutch is effected by the application of force to the cam rollers 28 at the inner extremities of levers 26, in such manner that levers 26 are moved clockwise with respect to their fulcrums 24, as viewed in Figures 2 and 3, and shoes 32 are drawn inwardly, against the centrifugal force created by their rotation, to a position in which they are free from driving engagement with the clutching surface 9a. For this purpose, the hub parts 12 and 14 are provided with axially extending ribs 40 and 42 on opposite sides of shaft 10 and cam wedges 44 and 46 are arranged to be slid axially back and forth on the ribs 40 and 42 while revolving with the shaft. The wedges 44 and 46 have inclined cam surfaces 44a and 46a which bear against the cam rollers 28 and thus determine the radial position of the latter with respect to the axis of the assembly (Figure 5). These wedges are connected with a common rotary ring 48 coaxial with shaft 10, and means are provided for shifting the latter to and fro; for example, a non-rotating collar 50 is connected to the ring 48 through bearings 52 and is adapted to be shifted axially on shaft 10 by movement of a lever 54 (Figure 1) which has pins at its end bearing against ears 56 on collar 50.

In the preferred embodiments of the invention each clutch lever 26 is fulcrumed approximately at its center of gravity, so that the weight of the lever 26 has little or no effect on the pressure of the friction lining 34 against the rim surface 9a. This pressure is furnished substantially entirely by the weight of the shoe 32. Thus the unit pressure on the friction lining at a given speed of rotation of the clutch shoes may be kept near a minimum, and the line shaft and clutch may be operated at a very high speed to develop the desired power output. This permits the direct connection of a motor shaft to the line shaft 10, making it unnecessary to use an intermediate V-belt drive. In addition, the reduced unit pressure on the friction lining tends to minimize the wear and increase the life of the lining.

Manifestly, the construction as thus far described does not permit the mechanism to be adjusted to provide for different accelerating torques or to ensure accurately balanced action of the plural clutching units in the operation of the machine. It is quite important that a centrifugal machine be operated continually with a uniform period of acceleration, and that the acceleration period be subject to controlled variation, because uniformity of operation and an operation best adapted for the particular type of material that is being treated are necessary if optimum efficiency is to be obtained in the treatment of the material and if a treated product of optimum quality is to be secured. Inflexibility of the mechanism with regard to adjustments, or inability to give a uniform clutching action cycle after cycle, due to variations of clutch pressure, wearing of the clutch linings, or other cause, would impair the utility of the apparatus. The apparatus of the present invention, however, is constructed so as to provide uniform clutching action while permitting adjustments to be made readily as needed or desired.

The principal means for adjusting the position of the clutch shoes with respect to the friction rim to ensure uniform and efficient clutching action is provided by special construction of the fulcral pin 24. As shown in Figure 4 this pin is eccentric with respect to its mounting in arms 22. A sector plate 60, having an arcuate slot 62, is secured to pin 24 so that the position of plate 60 determines the position of the pin. A holding screw 64 is threaded in arm 22 and extends through slot 62 to hold the plate 60 in any selected position. By reason of the eccentric construction of pin 24, when plates 60 are held in the position as shown in Figure 2, levers 26 and the clutch shoes 32 are held at their extreme inward position with respect to the friction rim, and as the plates 60 are turned counterclockwise the levers and shoes are brought nearer and nearer to the rim.

Adjustments of the heels of the shoes 32 are effected by means of bolts 66, which extend from the shoes through the outer extremities of levers 26 and are provided with adjustable nuts 68.

Springs 69 between levers 26 and shoes 32 permit movement of the latter about their swivel points 30, while the positions of nuts 68 determine the clearance between the shoe heels and the friction rim when the clutch is disengaged.

A set screw 70 is provided on each of the hub parts 12 and 14, to coact with an abutment 72 on the corresponding clutch lever 26. These set screws limit the inward movement of the levers and of the clutch shoes carried thereon so that the levers do not clatter when the line shaft 10 is being rotated at slow speed.

The clutch mechanism and the friction rim of the present invention have the function of transmitting accelerating torque from the continuously revolving line shaft 10 to the centrifugal machine. The frictional drive of the clutch shoe linings 34 on surface 9a causes the drum to revolve and thus causes rotation of the centrifugal spindle 1 and basket 2 through the quill 6, gear 5 and gear 4 and through the driving head between the latter and the spindle 1. The acceleration stays at a substantially constant rate from cycle to cycle. The centrifugal force produced by the revolution of the levers 26 and shoes 32 furnishes the pressure on the friction linings 34 which causes the machine to accelerate, and the amount of this pressure is dependent on the weight of the shoes and levers. To ensure smooth running of the clutch, the pressure of both linings against the friction surface 9a should be uniform. Consequently, the two levers 26 and the two shoes 32 should be very nearly the same weight and should be adjusted equally. Under these circumstances, the clutch continues to furnish a uniform accelerating torque for an indefinitely long period of time, since the speed of rotation of the shoes is kept substantially constant and the small variations in effective weight or radius which result from wearing of the friction linings are so small as to be insignificant. When the weight of the friction linings has been reduced by wear, the radius of the center of gravity of the levers 26 and shoes 32 may be increased by adjustment of pins 34, which tends to correct the loss of weight.

As seen in Figures 2 and 3, the effective weight of each lever and shoe assembly, and consequently their pressure and the accelerating torque of the clutch, can be varied by adding or removing weight at A, to a pin 76 secured to the lever 26. The addition of weight at this point, which is located on the same side of fulcral pin 24 as the clutch shoe, increases the centrifugal force and the pressure on the friction lining 34. The accelerating torque of the clutch can be reduced also by securing weights to the levers 26 at points B, which are located on the other side of fulcral pins 24, so that the centrifugal force produced by the added weight at B counterbalances a certain amount of the centrifugal force which otherwise would be effective to press the friction lining against surface 9a of the rim 9.

Slippage occurs between the friction linings on the clutch shoes and the clutching surface 9a during the acceleration of the machine, and it is necessary to dissipate the heat thus generated in order to maintain a rapid and uniform rate of acceleration, particularly in centrifugal operations which involve very rapid acceleration to high speeds. Accordingly, a free cooling surface 9b is provided, facing opposite to surface 9a, and water-supply means in the form of nozzles 80 and 82 are provided for constantly applying a stream or spray of water onto surface 9b. This water maintains a film on the cooling surface which keeps surface 9a and the friction linings 34 of shoes 32 at a desired operating temperature. Excess water is expelled from surface 9b by centrifugal force, or flows down and around the same when the rim is at rest, to escape through an annular opening 84 into a stationary shield 86 that surrounds the rim 9. The water is conducted away from shield 86 by a pipe 88. Novel cooling systems of this type, as such, are described and claimed in a copending application of Eugene Roberts, which issued as United States Letters Patent No. 2,191,261 on February 20, 1940.

The clutch mechanism of the present invention can be operated only in one direction, for example as indicated by the arrow in Figure 2. To adjust the clutch for operation, one of the shoes 32 should first be turned to its lowermost position, as seen in Figures 2, 3 and 4, and the wedges 44 and 46 should be pushed completely toward the hub 7, to a position in which the clutch shoes are disengaged from the clutching surface 9a. The clearance between the lining 34 of shoe 32 and the surface 9a of drum 9 should then be regulated so that the clearance is not less than $\frac{1}{32}$" at any point. It is preferable to set the clearance on the heel end of the shoe at about $\frac{1}{32}$" and on the toe end of the shoe at about $\frac{3}{64}$". These adjustments are made by changing the setting of the eccentric plate 60 and by turning the nut 66. The clearance between the set screw 70 and the abutment 72 should then be adjusted to about $\frac{1}{32}$", after which the clutch is turned 180° and the adjustments are repeated on the other shoe in exactly the same manner.

The clutch now should have been adjusted so that the wedges can be moved in and out freely, without exerting a pressure on rollers 28 when the high spots on the cam surfaces 44a and 46a pass under the rollers. Otherwise, the set screws 70 should be given more clearance so as to permit such movement. With the mechanism properly adjusted for operation, the line shaft 10 is rotated at a constant speed, and the centrifugal is started in its acceleration by actuating lever 54 to shift collar 50 away from hub 7, which shifts wedges 44 and 46, permits rollers 28 to move inwardly and permits the linings on clutch shoes 32 to be pressed by centrifugal force into frictional engagement with the rim surface 9a.

The braking or deceleration of the centrifugal is effected by a brake mechanism which cooperates with a frictional surface 9c on the outer side of rim 9. The brake includes arcuate bands 90 and 91 having friction linings 92. The brake bands are mounted on a bracket and adjusting mechanism 94 at their upper ends and are adapted to be drawn uniformly toward each other and into contact with surface 9c by suitable mechanism 96 at their lower ends. A free cooling surface 9d is provided inside rim 9, facing opposite the braking surface 9a. Since the former faces toward surface 9b, the stream or spray of cooling liquid that is introduced inside the rim from nozzles 80 and 82 serves likewise as a cooling medium for the brake, which is constantly maintained at a desirable operating temperature. Thus, overheating and undue wearing of the brake linings are avoided, and uniform accelerating and braking times are obtained, cycle after cycle, without encountering overheating or mechanical troubles.

The illustrated combination of clutching, driving and braking means in a centrifugal machine is not claimed as part of the present invention, but is claimed in a co-pending application of Eugene Roberts, Serial No. 137,282, filed April 16, 1937, now U. S. Patent No. 2,294,207, issued August 25, 1942.

The improved clutch mechanism of the present invention gives greater accelerating torque and enables more rapid acceleration than prior constructions. At the same time it is more economical and efficient in use, and it is readily adapted for the proper treatment of various types of materials in the centrifugal.

An application of the improved clutch mechanism to the line pulley shaft of a belt-driven centrifugal machine is illustrated in Figure 6. Shaft 110 has a hub 112 freely mounted thereon, and hub 112 carries the belt rim 116 through a spider 114. An integral clutch rim 118 extends concentrically from spider 114. Rim 118 presents an inner surface 118a for cooperation with friction clutch shoes and an opposite, free cooling surface 118b. The clutch mechanism is similar to that described in reference to Figures 1 to 5. A hub 112, fast on shaft 110, has integral radial arms 124 which provide fulcrum points for levers 126. Friction-lined clutch shoes 128 are swivelled on levers 126. An inner extremity of each lever carries a cam roller 130 which is movable outwardly from the axis of the assembly by an axially-slidable wedge 132. The wedges are carried by a common rotary ring 134, which is shiftable back and forth by a non-rotary slidable collar 136.

Flanges 140 and 141 on the outer side of rim 118 define an annular chamber which opens outwardly through an annular opening 142 into a stationary shield 144. The shield has side flanges 145 and 146 which embrace the margins of flanges 140 and 141, and liquid sealing rings between the flanges prevent the escape of water between the rim and shield. A spray nozzle 150, connected with a water supply pipe 152, is mounted on shield 144 and positioned to direct a spray of water onto surface 118b. The water is thrown from the rim into the shield by centrifugal force, or when the rim is not rotating at a substantial speed the water flows around the rim and drops into the shield. From the latter, the used water is drawn off through a pipe 154. This cooling system is similar to the system already described, and it is claimed in the aforesaid Roberts Patent No. 2,191,261.

While numerous details of construction have been shown and described in order to permit ready adaptation of the invention to practical use, it will be apparent to persons skilled in the art that the novel features of the invention may be embodied in many other forms of construction. I, therefore, desire that the invention be accorded a scope fully commensurate with its novel contributions, without limitation to non-essential details.

I claim:

1. A heavy-duty slip clutch mechanism comprising a driving shaft that is normally rotated at substantially constant speed, an annular friction rim surrounding said shaft and having an inner clutch surface, and a clutch mechanism secured to said shaft to rotate therewith and responsive only to centrifugal force to engage said surface to accelerate and drive the rim, characterized in that said clutch mechanism includes mating hub parts secured together and keyed to said shaft for rotation therewith, oppositely disposed radial arms secured to and extending from the respective hub parts, a clutch lever fulcrumed intermediate its ends to each of said arms for limited free movement about its fulcrum, each of said levers extending obliquely from an inner end disposed near said hub parts on one side of its fulcrum to an outer portion disposed near the rim on the other side of its fulcrum, a clutch shoe, having a friction-lined arcuate face, pivotally connected to the outer portion of each lever in position to be pressed by centrifugal force into engagement with said surface when the shaft is rotated and the inner end of said lever is positioned to allow such movement, cam means on the inner ends of said levers and cooperating cam means slidable along said shaft for shifting the inner ends of said levers to a position in which the clutch shoes, though rotating at a high speed, are held clear of said surface.

2. A heavy-duty slip clutch mechanism comprising a driving shaft that is normally rotated at substantially constant speed, an annular friction rim surrounding said shaft and having an inner clutch surface, and a clutch mechanism secured to said shaft to rotate therewith and responsive only to centrifugal force to engage said surface to accelerate and drive the rim, characterized in that said clutch mechanism includes mating hub parts secured together and keyed to said shaft for rotation therewith, oppositely disposed radial arms secured to the respective hub parts, said arms being forked at their extremities, a fulcrum pin extending across the fork of each arm, a clutch lever fulcrumed intermediate its ends to each of said fulcrum pins and free to pivot thereon when the mechanism is inactive, said lever extending obliquely from an inner end on one side of the fulcrum disposed near said hub parts to an outer portion disposed near the clutch surface on the other side of the fulcrum, a clutch shoe having a friction-lined arcuate face pivotally connected to the outer portion of each lever in position to be pressed by centrifugal force into engagement with said surface when the shaft is rotated and the inner end of said lever is unrestrained so as to allow such movement, and cam means slidable along said shaft for shifting the inner ends of said levers to a position in which the clutch shoes, though rotating at a high speed, are held clear of said surface.

3. A heavy-duty slip clutch mechanism comprising a driving shaft that is normally rotated at substantially constant speed, an annular friction rim surrounding said shaft and having an inner clutch surface, and a clutch mechanism secured to said shaft to rotate therewith and responsive only to centrifugal force to engage said surface to accelerate and drive the rim, characterized in that said clutch mechanism includes radial arms secured to the shaft, a clutch lever fulcrumed intermediate its ends to each of said arms and free to pivot on its fulcrum when the mechanism is inactive, said lever extending obliquely from an inner end disposed near the shaft on one side of the fulcrum to an outer portion disposed near the rim on the other side of the fulcrum, a clutch shoe, having a friction-lined arcuate face, pivotally connected substantially at its center of gravity to the outer portion of each lever in position to be pressed by centrifugal force into engagement with said surface when the shaft is rotated and the inner end of said lever is unrestrained so as to allow such movement, cam means slidable along said shaft for shifting the inner ends of said levers to a position in which the clutch shoes, though rotating at a high speed, are held clear of said surface, and adjustable fulcrum means mounting said clutch levers on said radial arms for adjustment in a radial direction to compensate for wearing of the friction linings.

4. A heavy-type slip clutch mechanism comprising a driving shaft that is normally rotated at substantially constant speed, an annular friction rim surrounding said shaft and having an inner clutch surface, and a clutch mechanism secured to said shaft to rotate therewith and responsive only to centrifugal force to engage said surface to accelerate and drive the rim, characterized in that said clutch mechanism includes radial arms secured to the shaft, said arms being forked at their extremities, an adjustable fulcrum pin extending across the fork of each arm, a substantially J-shaped clutch lever fulcrumed intermediate its ends to each of said fulcrum pins and free to pivot thereon when the mechanism is inactive, said lever extending obliquely with its inner end disposed near said shaft on one side of the fulcrum and with its base disposed near the clutch surface on the other side of the fulcrum, a clutch shoe, having a friction-lined arcuate face, pivotally connected to the base of each lever in position to be pressed by centrifugal force into engagement with said surface when the shaft is rotated and the inner end of said lever is unrestrained so as to allow such movement, cam means slidable along said shaft for shifting the inner ends of said levers to a position in which the clutch shoes are held clear of said surface, said fulcrum pins being eccentric with respect to their mounting on said arms, and means for turning said pins to vary the radial distance between the clutch shoes and clutch surface.

5. A heavy-duty slip clutch mechanism comprising a driving shaft that is normally rotated at substantially constant speed, an annular friction rim surrounding said shaft and having an inner clutch surface, and a clutch mechanism secured to said shaft to rotate therewith and responsive only to centrifugal force to engage said surface to accelerate and drive the rim, characterized in that said clutch mechanism includes radial arms secured to the shaft, said arms being forked at their extremities, a fulcrum pin extending across the fork of each arm, a clutch lever fulcrumed intermediate its ends to each of said fulcrum pins and free to pivot thereon when the mechanism is inactive, each lever extending inwardly on one side and toward the clutch surface on the other side thereof, a clutch shoe, having a friction-lined arcuate face, pivotally connected to each lever in position to be pressed by centrifugal force into engagement with said surface when the shaft is rotated and the inner end of said lever is unrestrained so as to allow such movement, cam means slidable along said shaft for shifting the inner ends of said levers to a position in which the clutch shoes are held clear of said surface, said fulcrum pins being eccentric with respect to their mounting on said arms, means for turning said pins to vary the radial distance between the clutch shoes and clutch surface, said last recited means including a manually turnable plate secured to an end of each eccentric pin and means for securing the plate in adjusted position.

6. A heavy-duty slip clutch mechanism comprising a driving shaft, an annular friction rim surrounding said shaft and having an inner clutch surface and a clutch mechanism secured to said shaft to rotate therewith and responsive only to centrifugal force to engage said surface to accelerate and drive the rim, said clutch mechanism including radial arms secured to said shaft, a clutch lever fulcrumed intermediate its ends to each of said arms and extending obliquely from an inner end disposed near the shaft on one side of the fulcrum to an outer portion disposed near the rim on the other side of the fulcrum, each lever being free to pivot on its fulcrum when the mechanism is inactive, a clutch shoe, having a friction-lined arcuate face, pivotally connected to each lever in position to be pressed by centrifugal force into engagement with said surface when the shaft is rotated and the inner end of said lever is unrestrained so as to allow such movement, means for shifting the inner ends of said levers to a position in which the clutch shoes, though rotating at high speed, are held clear of said surface, the pivotal connections between said clutch shoes and levers being located centrally with respect to said shoes and on said outer portions intermediate the outer ends and the fulcrums of said levers, and adjustable connecting means between the heel of each shoe and the outer end of each lever whereby to adjust the clearance between the heel of the shoe and said clutch surface.

7. A heavy-duty slip clutch mechanism comprising a driving shaft, an annular friction rim surrounding said shaft and having an inner clutch surface and a clutch mechanism secured to said shaft to rotate therewith and responsive only to centrifugal force to engage said surface to accelerate and drive the rim, said clutch mechanism including radial arms secured to said shaft, a clutch lever fulcrumed intermediate its ends to each of said arms and extending inwardly on one side of the fulcrum and toward the rim on the other side thereof, a clutch shoe, having a friction-lined arcuate face, pivotally connected to each lever in position to be pressed by centrifugal force into engagement with said surface when the shaft is rotated and the inner end of said lever is positioned to allow such movement, means for shifting the inner ends of said levers to a position in which the clutch shoes are held clear of said surface, each of said clutch levers having weight-holding means on both sides of its fulcrum allowing the addition of weights thereto or the removal of weights therefrom on either side of the fulcrum whereby to adjust the operating pressure of the clutch shoes on the clutch surface.

8. A heavy-duty slip clutch mechanism comprising a driving shaft, an annular friction rim surrounding said shaft and having an inner clutch surface and a clutch mechanism secured to said shaft to rotate therewith and responsive only to centrifugal force to engage said surface to accelerate and drive the rim, said clutch mechanism including radial arms secured to said shaft, a clutch lever fulcrumed intermediate its ends to each of said arms and extending obliquely from an inner end disposed near said shaft on one side of the fulcrum to an outer portion disposed near the rim on the other side of the fulcrum, each lever being free to pivot on its fulcrum when the mechanism is inactive, a clutch shoe, having a friction-lined arcuate face, pivotally connected to the outer portion of each lever in position to be pressed by centrifugal force into engagement with said surface when the shaft is rotated, a cam roller mounted on the inner end of each of said clutch levers to roll around an axis transverse to the axis of clutch rotation, and cam means slidable along said shaft for engaging said rollers and shifting the inner ends of said levers radially to a position in which the clutch shoes are held clear of said surface.

9. A heavy-duty slip clutch comprising a driving shaft, an annular friction rim surrounding said shaft and having an inner clutch surface and a clutch mechanism secured to said shaft to rotate therewith and responsive only to centrifugal force to engage said surface to accelerate and drive the rim, said clutch mechanism including radial arms secured to said shaft, a clutch lever fulcrumed intermediate its ends to each of said arms and extending obliquely from an inner end disposed near said shaft on one side of the fulcrum to an outer portion disposed near the rim on the other side of the fulcrum, each of said levers being free to pivot on its fulcrum when the clutch is inactive, a clutch shoe, having a friction-lined arcuate face, pivotally connected to the outer portion of each lever in position to be pressed by centrifugal force into engagement with said surface when the shaft is rotated, a cam roller mounted on the inner end of each of said clutch levers to roll around an axis transverse to the axis of clutch rotation, and cam means slidable along said shaft for engaging said rollers and shifting the inner ends of said levers radially to a position in which the clutch shoes are held clear of said surface, said cam means including a rotary slide ring keyed to rotate with said shaft, and a plurality of wedges extending axially from said ring to positions underlying and in contact with said rollers.

10. A clutch mechanism for centrifugal machines and the like comprising a driving shaft that is normally rotated at substantially constant speed, an annular friction rim surrounding said shaft to be driven therefrom and having an inner clutch surface, and a centrifugally actuated clutch mechanism secured to said shaft to rotate therewith and adapted to engage said surface to accelerate and drive the rim by friction, said clutch mechanism including a split hub keyed to said shaft, oppositely-disposed radial arms extending from said hub, said arms being forked at their extremities, a fulcrum pin extending across the fork of each arm and journalled eccentrically therein, a clutch lever fulcrumed intermediate its ends to each fulcrum pin and extending transverse to the shaft on both sides of its fulcrum, a clutch shoe, having a friction-lined arcuate face, pivotally connected to each clutch lever on one side of its fulcrum along an axis centrally disposed with respect to the shoe and parallel to the lever fulcrum, each of said shoes disposed to move into frictional engagement with said clutch surface when the clutch is active, adjustable connecting means between the heel of each clutch shoe and the end portion of the corresponding clutch lever for adjusting the clearance between the shoe heel and said clutch surface, a cam roller mounted on each clutch lever, on the other side of its fulcrum, so as to roll around an axis transverse to said shaft, said hub having integral guides extending parallel to the shaft, a slide ring adjacent said hub and keyed to rotate with said shaft, a plurality of wedges extending from said ring, each wedge positioned to slide along one of said guides with the outer surface thereof in engagement with one of said cam rollers, a collar engaging said ring and slidable on said shaft to change the position of said wedges, each of said clutch levers having weight holding means on both sides of its fulcrum, and adjustable means for changing the positions of said fulcrum pins with respect to said arms.

11. In a slip clutch mechanism comprising a driving shaft, an annular friction rim surrounding the shaft and having an inner clutch surface and mechanism secured to said shaft to rotate therewith and responsive only to centrifugal force to engage said surface to accelerate and drive the rim, a pair of oppositely disposed radial arms forked at their ends and secured to said shaft for rotation therewith, a pair of substantially J-shaped clutch levers fulcrumed substantially at their centers of gravity on pins extending between the forked ends of said arms and free to pivot on said pins when the mechanism is inactive, each of said levers having its inner end disposed near said shaft on one side of its fulcrum and its base disposed near said clutch surface on the other side of its fulcrum, an arcuate clutch shoe pivotally connected substantially at its center of gravity to the base of each lever in position to be pressed by centrifugal force into engagement with said surface when the shaft is rotated and the inner end of said lever is unrestrained so as to allow such movement, the inner ends of said levers having cam elements thereon, and cooperating cam means movable along said shaft to control the radial position of said levers and shoes.

12. A clutch mechanism according to claim 11, and a radially adjustable connection between the heel of each of said shoes and the outer end of the corresponding lever for controlling the operating clearance between the shoe heel and the clutch surface.

13. A clutch mechanism according to claim 11, in which each of the said levers has weight-holding means on both sides of its fulcrum to allow the addition or removal of weights whereby to vary the operating pressure of the clutch shoes against the clutch surface, and hence the accelerating power of the mechanism, for any given speed of rotation of said shaft.

JOSEPH HERTRICH.